United States Patent
Tanner

(10) Patent No.: US 11,330,171 B1
(45) Date of Patent: May 10, 2022

(54) LOCALLY ADAPTIVE LUMINANCE AND CHROMINANCE BLENDING IN A MULTIPLE IMAGER VIDEO SYSTEM

(71) Applicant: Altia Systems, Inc., Cupertino, CA (US)

(72) Inventor: Jason Daniel Tanner, Folsom, CA (US)

(73) Assignee: GN AUDIO A/S

( * ) Notice: Subject to any disclaimer, the term of this patent is extended or adjusted under 35 U.S.C. 154(b) by 851 days.

(21) Appl. No.: 13/902,136

(22) Filed: May 24, 2013

Related U.S. Application Data

(60) Provisional application No. 61/652,060, filed on May 25, 2012.

(51) Int. Cl.
    *H04N 5/232*      (2006.01)

(52) U.S. Cl.
    CPC .............................. *H04N 5/23238* (2013.01)

(58) Field of Classification Search
    CPC ............. H04N 5/23238; H04N 5/2628; H04N 5/2259; G02B 13/06; G06T 3/4038
    USPC ........................................................ 348/36
    See application file for complete search history.

(56) References Cited

U.S. PATENT DOCUMENTS

| | | | | |
|---|---|---|---|---|
| 6,301,386 B1* | 10/2001 | Zhu | ........................ | G06K 9/342 382/173 |
| 6,813,391 B1* | 11/2004 | Uyttendaele | ............. | G06K 9/03 345/629 |
| 2005/0226531 A1* | 10/2005 | Silverstein | ................ | G06T 3/00 382/284 |
| 2006/0008176 A1* | 1/2006 | Igari | ...................... | G06T 3/4038 382/284 |
| 2006/0182350 A1* | 8/2006 | Kondo | .................... | H04N 19/60 382/232 |
| 2007/0047834 A1* | 3/2007 | Connell | ..................... | G06T 5/50 382/274 |
| 2010/0194851 A1* | 8/2010 | Pasupaleti | ............ | H04N 1/3876 348/36 |
| 2011/0096136 A1* | 4/2011 | Liu | ........................ | H04N 7/144 348/14.07 |
| 2011/0181617 A1* | 7/2011 | Tsuda | ..................... | G06F 3/0481 345/619 |
| 2012/0169842 A1* | 7/2012 | Chuang | ............ | G08B 13/19619 348/39 |

* cited by examiner

*Primary Examiner* — Matthew K Kwan
(74) *Attorney, Agent, or Firm* — HM Law Group LLP; Vani Moodley, Esq.

(57) ABSTRACT

A method for blending a left image with a right image along a seam is disclosed. The method comprises selecting collocated pixels from a collocated column of pixels in the left image and the right image; computing differences in the selected collocated pixels; and determining a correction amount to apply to seam pixels along the seam on a row-by-row basis based on the computed differences; and selectively applying the correction amount on a row-by-row basis to a neighborhood of pixels extending transversely across the seam and centered on seam.

14 Claims, 6 Drawing Sheets

Applying Correction $\Delta j$

Pixels affected will be seam $\pm$ ( $\Delta j$ * blend_width )

EXAMPLE

|  | i-seam-5 | i-seam | i-seam+5 |  |
|---|---|---|---|---|
| j=0 | -1 -1 -1 -2 -2 -2 | +2 +2 +2 +1 +1 +1 | $\Delta 2$ | blend width=3 |
|  | -2 -2 -2 -3 -3 -3 | +3 +3 +3 +2 +2 +2 | $\Delta 3$ | |
| j=2 | -2 -2 -2 -3 -3 -3 | +3 +3 +3 +2 +2 +2 | $\Delta 3$ | |
|  | -2 -2 -2 -4 -4 -4 | +4 +4 +4 +3 +3 +3 | $\Delta 4$ | |

Linear ramp of variable width depending on magnitude of $\Delta j$ $$P_{i,j} = P_{i,j} \begin{bmatrix} + \Delta j - \frac{(i-seam)}{blend\ width} & i > seam \text{ AND } \frac{(i-seam)}{blend\ width} < \Delta j \\ - \Delta j + \frac{(seam-i)}{blend\ width} & i < seam \text{ AND } \frac{(seam-i)}{blend\ width} < \Delta j \end{bmatrix}$$

for j=1......height
i=seam $\pm$ $\Delta j$ * blend_width

*FIG. 5*

LOCALLY ADAPTIVE LUMINANCE AND CHROMINANCE BLENDING IN A MULTIPLE IMAGER VIDEO SYSTEM

This application claims the benefit of priority to U.S. Provisional Patent Application No. 61/652,060, which was filed on May 25, 2012, the entire specification of which is incorporated herein by reference.

FIELD

Embodiments of the invention relate generally to panoramic imaging systems that produce panoramic images through a process of stitching multiple images together.

BACKGROUND

Panoramic imaging systems may be used to produce panoramic video with a wide field-of-view and may be classified as single imager/sensor systems or multiple imager systems.

With single imager/sensor systems, a single imager with a wide-angle lens is used to produce panoramic video.

With multiple imager systems, multiple imagers each with a different field-of-view are used to capture images for a scene. The images are then stitched together to produce panoramic video. For example, FIG. 1 illustrates the process of stitching together two images 100 and 102. It is to be noted that the same process applies to the case of stitching more than two images. Referring to FIG. 1, it will be seen that the image 100 includes a region of overlap 104, whereas the image 102 includes a region of overlap 108.

Solid lines 106 and 110 define merge lines. The significance of the merge lines 106 and 110 is that they demarcate redundant information on the images 100 and 102 that is to be removed during merging/stitching. Thus, for the image 100 on the left, the dotted information right of the merge line 106 (and similarly for the image 102 on the right, the dotted information left of the merge line 110) will be removed since it is redundant information.

The ideal multi imager video system should leave a viewer unaware that multiple imagers recorded the video. Thus, the viewer has a seamless experience in which the multiple imagers appear as a single imager. However, many factors can make each imager record the same scene at the same time differently. These include different exposures, variance in lenses, vignetting, different angle of incident, temperature differences, etc. Moreover, illumination can vary differently from the center to the edges of the image (vignetting), vary in time (such as temperature), and be difficult to predict (angle of incidence).

For a seamless experience, the process of blending or stitching together of the imagers from multiple imagers needs to correct for the aforementioned differences.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

In one aspect, a method for blending a left image with a right image along a seam is disclosed. The method comprises selecting collocated pixels from a collocated column of pixels in the left image and the right image; computing differences in the selected collocated pixels; and determining a correction amount to apply to seam pixels along the seam on a row-by-row basis based on the computed differences; and selectively applying the correction amount on a row-by-row basis to a neighborhood of pixels extending transversely across the seam and centered on seam.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 5 shows the application of a linear ramp of variable width based on the magnitude of $\Delta(j)$, in accordance with one embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
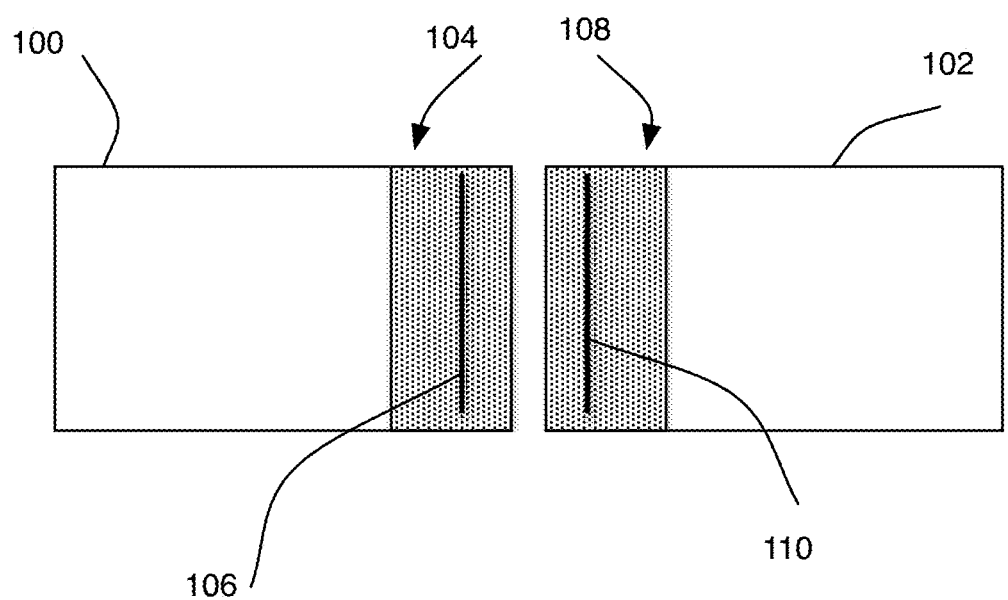
FIG. 1 illustrates the process of stitching together two images.
Figure 2:
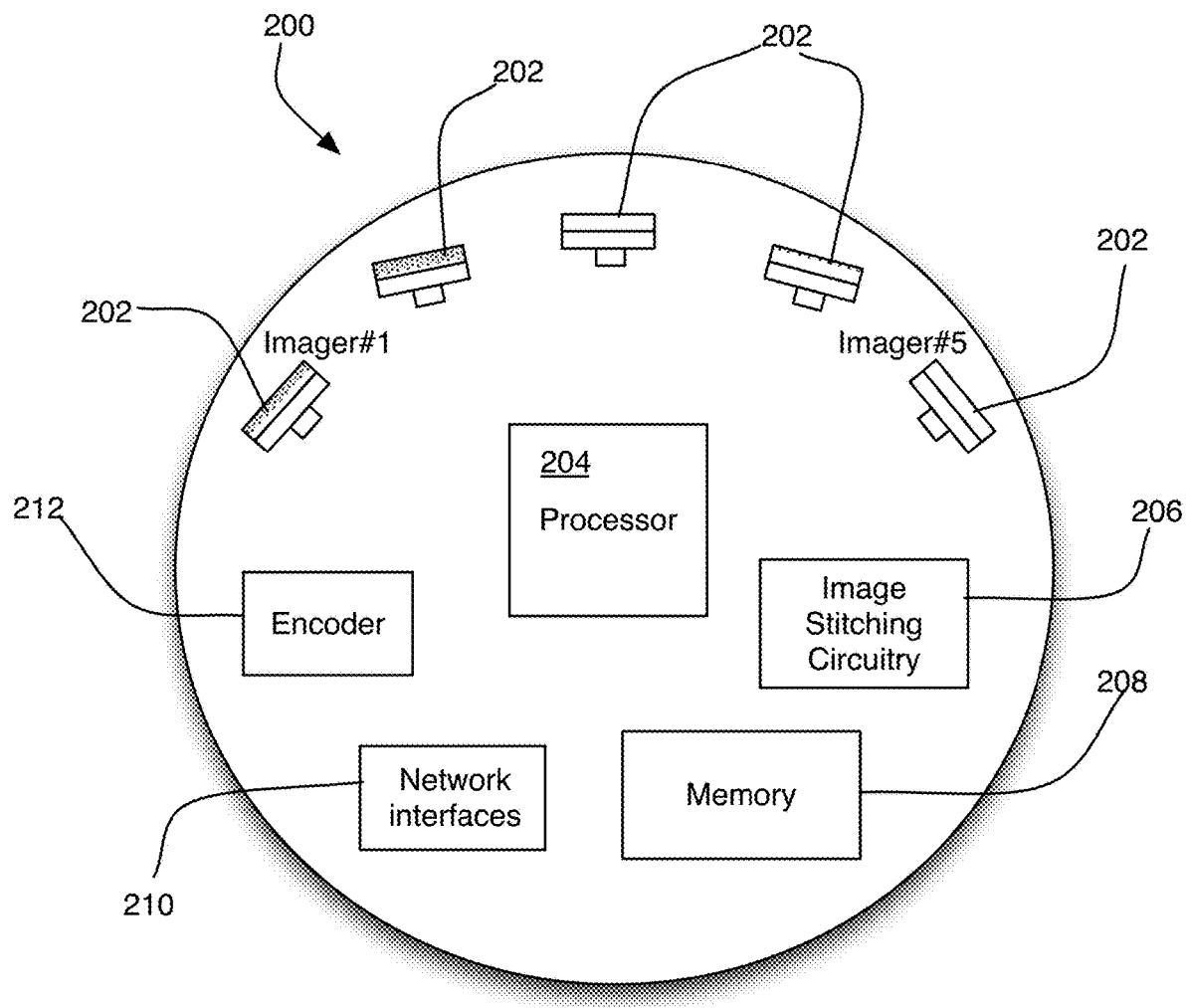
FIG. 2 illustrates an example embodiment of an apparatus configured for generating panoramic images according to one embodiment of the invention.

FIG. 2 illustrates an example embodiment of an apparatus configured for generating panoramic images according to one embodiment of the invention, in the form of multiple imager video system (camera) 200.

The system 200 includes multiple imagers/sensors 202 mounted along an arc such that each imager 202 is directed to capture a portion of a scene. Each imager 202 may include suitable sensors, for example charge-coupled device (CCD) or complimentary metal-oxide semiconductor (CMOS) imaging sensors, as is known in the art.

The system 200 also includes logic/processor 204, image stitching circuitry 206, memory 208, and one or more network interfaces 210. In one embodiment, digital signals recorded by sensors 202 are sent to the logic/processor 204 for processing. In one embodiment, the logic/processor 204 may execute programs for implementing image processing functions and calibration functions, as well as for controlling the operation of the entire device 200 including its image capture operations. Optionally, the logic/processor 204 may include signal processing functionality for performing image processing, including image filtering, enhancement and for combining multiple fields of view in cooperation with the image stitching circuitry 206, as will be explained in greater detail below. Although shown separately, in some embodiments, the image stitching circuitry 206 may exist as part of the logic/processor 204. It is to be understood that components of the device 200 may take the form of hardware, software, firmware, or any combination of hardware, software, and firmware.

Digital signals representing a panoramic view may be stored in memory 208. The encoder 212 may compress digital signals before transmission via a network interface 210. The network interfaces 210 may be configured to provide network connectivity to the device 200. As such, the network interfaces 210 may include wireless and wired interfaces, in accordance with different embodiments.

Each image sensor 202 captures a different portion of a scene to be imaged. The images recorded by adjacent imagers 202 may include different luminance and chrominance values. Thus, when images from the multiple sensors 202 are stitched in order to produce a single panoramic image, discontinuities may exist where the adjacent images meet.

Embodiments of the present invention disclose an image stitching method that utilizes a locally adaptive luminance and chrominance blending process. Advantageously, the process corrects for luminance and chrominance differences between the images being combined or stitched, thus at least partially removing artifacts in resultant panoramic video images due to luminance and chrominance difference across merge lines.

Figure 3:
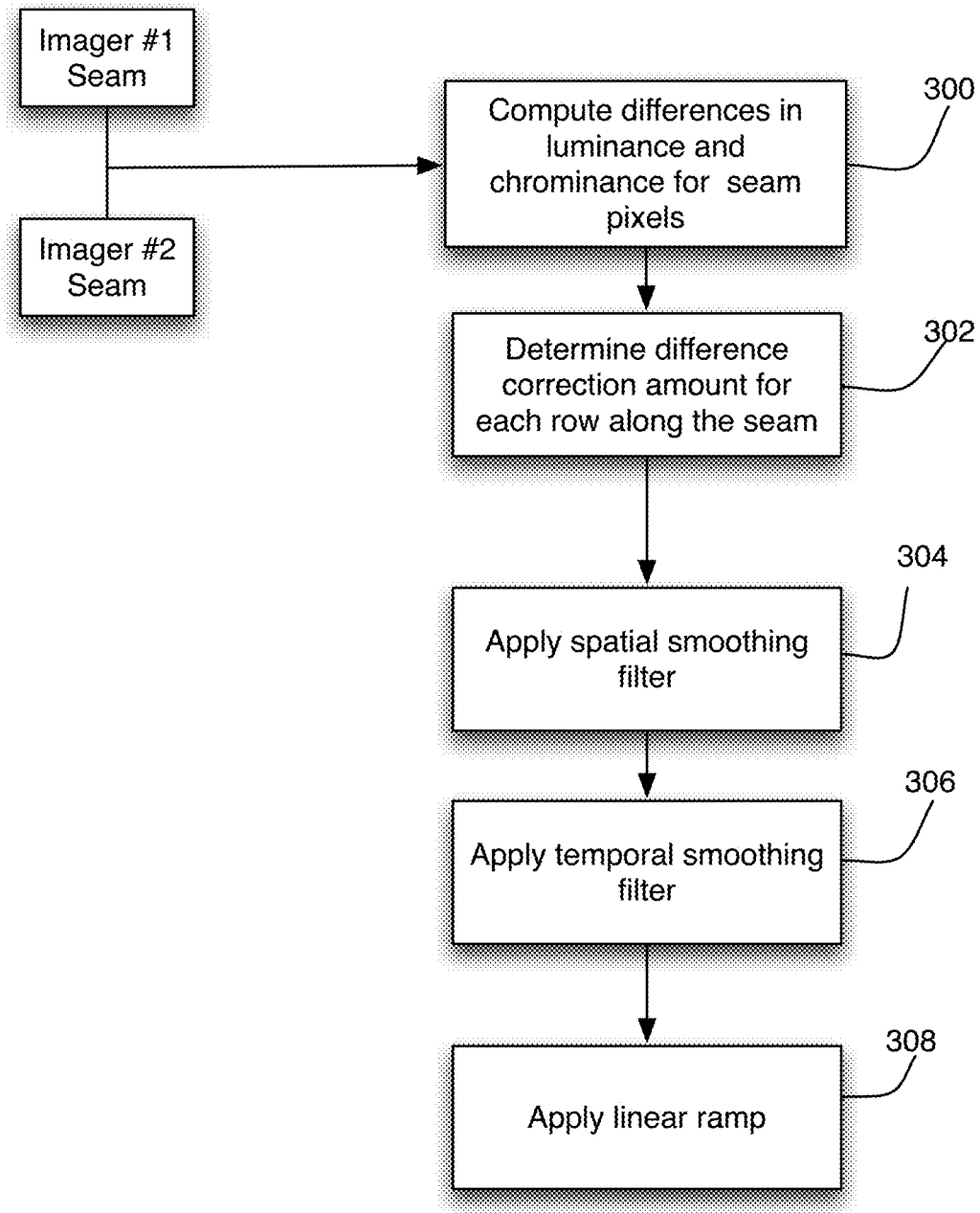
FIG. 3 shows a flowchart of a process for correcting the luminance and chrominance differences between two images, in accordance with one embodiment of the invention.

The process of correcting the luminance and chrominance differences between two images is illustrated in FIG. 3 of the drawings, where the following processing blocks are executed in accordance with one embodiment:

Block 300: In this block the intensity difference between overlapping pixels from two imagers (imager #1 and imager #2 in FIG. 3) is computed. The intensity difference may include luminance differences for the correction of luminance differences during image stitching, and chrominance differences for the correction of chrominance differences during stitching. The block 300 includes the computation of a difference diff(j) for each pixel j along the seams from j=1 to the height of the seams by subtracting the luminance and chrominance values of collocated pixels between the two imagers as specified in the equation below.

$$\text{diff}(j) = \text{seam}_{left}(j) - \text{seam}_{right}(j) \text{ for } j=1 \ldots \text{height}$$

In the above equation $\text{seam}_{left}(j)$ and $\text{seam}_{right}(j)$ denotes the jth pixel along the seams for the left imager and the right imager, respectively. In one embodiment, the values for diff(j) may be computed based on a sliding window of pixels applied along the seams. Each sliding window defines window a neighborhood of pixels of a fixed size, e.g. 1×8, 3×8, 1×16, etc. extending along the seams.

In one embodiment, the pixels within each sliding window are first sorted before performing the subtraction. This latter method yields improved results for small differences in misalignment.

The output of the block 300 includes a neighborhood of pixels to compute a correction or adjustment amount for a row. For example, a 1×N neighborhood would output $$\text{diff}\left(j - \frac{N}{2}\right) \ldots \text{diff}\left(j + \frac{N}{2}\right)$$

to the block 302.

Block 302: In this block, the difference amounts calculated in the block 300 are used to determine a correction/adjustment amount for each row along the seam of the stitched image. In one embodiment, a median filter over the neighborhood pixels may be used to calculate the correction:

$$\Delta(j) = \text{median}\left(\text{diff}\left(j - \frac{N}{2}\right) \ldots \text{diff}\left(j + \frac{N}{2}\right)\right) \text{ where } N \text{ is filter width}$$

where $\Delta(j)$ is the correction/adjustment amount for that row.

In another embodiment, the correction/adjustment value may be filtered by adjusting the correction according to the spatially adjacent adjustment or temporally collocated adjustment according to the equation below:

$$\Delta(j) = f\left(\Delta(j-1), \Delta_{frame-1}(j), \text{diff}\left(j - \frac{N}{2}\right) \ldots \text{diff}\left(j + \frac{N}{2}\right)\right)$$

In one embodiment, before computing the median, certain diff values may be flagged as invalid, for example by comparing each diff value to a fixed threshold (threshold ranges vary according to exposure differences) or with a prior frame diff value. Invalid pixels are replaced by $\Delta(j-1)$ for spatial filtering or $\Delta_{frame-1}(j)$ for temporal filtering. After replacing the invalid pixels, the median filter of the N diff pixels produce $\Delta(j)$, which defines the correction/adjustment amount for the jth row.

Block 304: In this block, the $\Delta(j)$ for the current row is spatially adjusted. If $\Delta(j)$ changes too frequently, visual artifacts such as flaring can occur. In one embodiment, the spatial adjustment limits how much $\Delta(j)$ can change relative to $\Delta(j-1)$ or limits changes to $\Delta(j)$ after M rows indicate the value should be higher or lower.

Block 306: If the $\Delta(j)$ changes frequently from frame to frame, visual strobing artifacts would be visible in the stitched image. In one embodiment, block 306 includes temporal filtering to limit $\Delta(j)$ to be within a range of $\Delta_{frame-1}(j)$. In another embodiment, the range expands and shrinks according to the amount of change in the region of interest for the two frames. When there are more changes in the scene, stronger changes in $\Delta(j)$ are allowed, but during static scenes the range is more limited.

Figure 4:
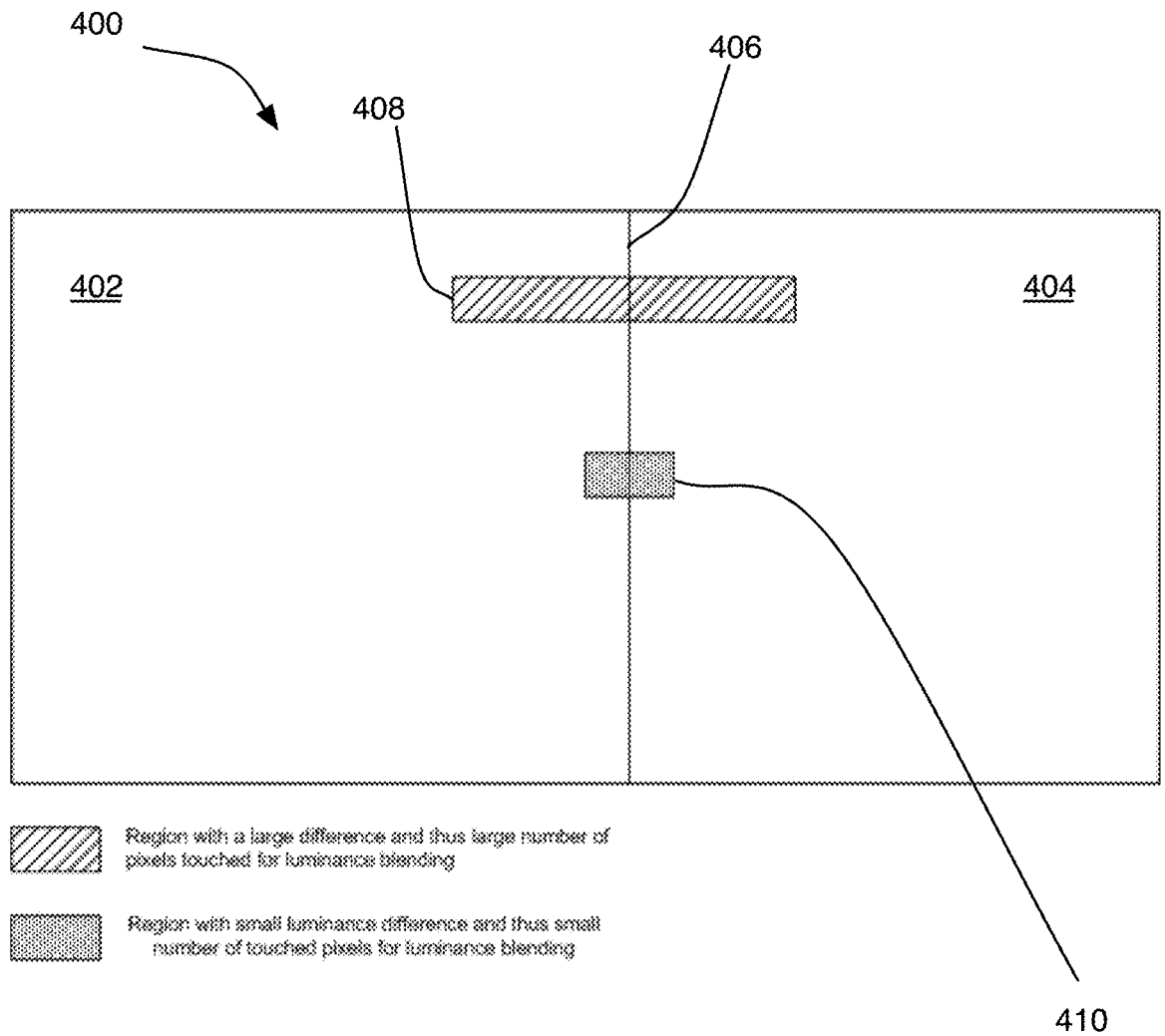
FIG. 4 illustrated how blend width depends on a magnitude of the correction applied, in accordance with one embodiment of the invention.

Block 308: In this block, $\Delta(j)$ is applied with a linear gradient. In one embodiment, the size of the linear gradient is relative to $\Delta(j)$. A small $\Delta(j)$ will only correct a small neighborhood of pixels whereas a large $\Delta(j)$ will spread across a large neighborhood. This is illustrated in FIG. 4. Referring to FIG. 4 stitched image 400 is produced by stitching together images 402 and 404 alone merge line 406. Reference numerals 408 and 410 indicate neighborhoods of pixels extending transversely across the merge line or seam 406. Each neighborhood 408,410 represents a neighborhood of pixels (also referred to herein as "a blend width") affected by the correction for luminance and chrominance. As will be seen, the neighborhood 408 is wider than the neighborhood 410. This is because the $\Delta(j)$ for the seam pixel running through the neighborhood 408 is larger than $\Delta(j)$ for the seam pixel running through the neighborhood 410. The aforesaid technique of scaling the neighborhood of pixels across the seam affected by the correction based on the magnitude of $\Delta(j)$ advantageously corrects for vignetting and similar differences between the imagers that can vary across the seam.

FIG. 5 of the drawings illustrates an example of the application of the correction $\Delta(j)$ along seam pixels for j=0 to 4. The neighborhood of pixels along each row centered on the seam and extending transversely across the seam affected by the correction can be specified as:

$\pm(\Delta(j)*\text{blend width})$.

FIG. 5 shows the application of a linear ramp of variable width based on the magnitude of $\Delta(j)$.

$$P(i, j) = P\left(i, j \begin{cases} \Delta(j) - \frac{(i-\text{seam})}{\text{blend width}}, & i > \text{seam AND } \frac{i-\text{seam}}{\text{blend width}} < \Delta(j) \\ -\Delta(j) + \frac{(\text{seam}-i)}{\text{blend width}}, & i+ < \text{seam AND } \frac{\text{seam}-i}{\text{blend width}} < \Delta(j) \end{cases}\right)$$

for j=1 . . . height; and i=seam$\pm(\Delta(j)*$blend width).

Figure 6:
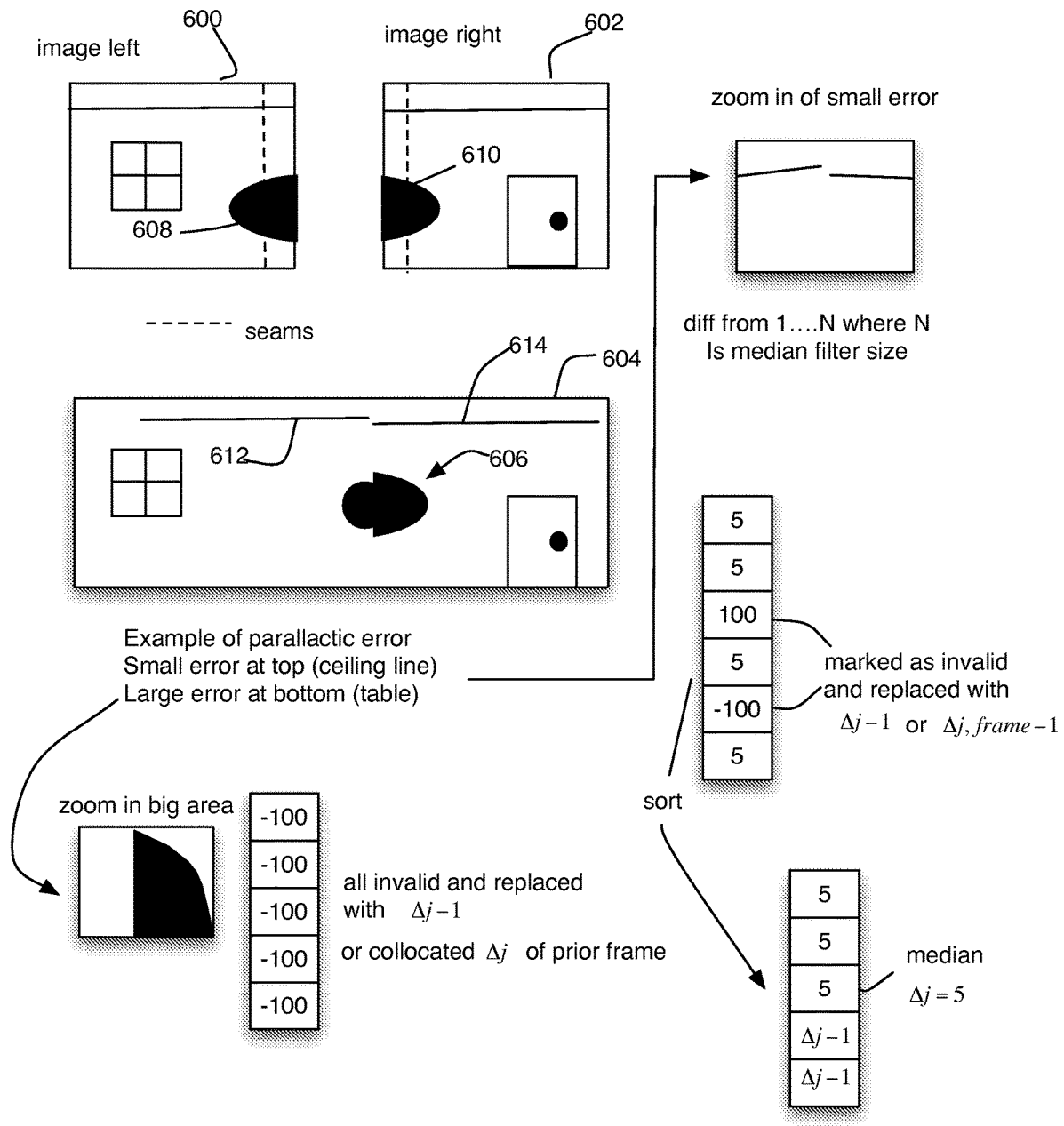
FIG. 6 illustrated how correction amounts are filtered based on spatial and temporal filtering, in accordance with one embodiment of the invention.

One challenge with multiple imager video systems stems from objects seen by one imager but not the neighbor imager. Typically, this is a result from something being too close to the camera (for instance covering one imager completely). For example, FIG. 6 shows images 600 and 602 corresponding to a scene. The images 600 and 602 are stitched together to form a panoramic image 604. The panoramic image 604 includes an elliptical object 606 that is the product of merging ellipsoidal portions 608 and 610 from the images 600 and 602, respectively. The edges in the ellipsoidal portions 608 and 610 do not match because of parallactic error from being too close to the camera. In this example, the camera was calibrated to minimize parallactic error at a distance further than the elliptical object 606. Thus, the portions 608 and 610 show up as mismatching content (606) in the image 604.

To properly correct for mismatching content, in one embodiment, the calculation of the differences in block 306 distinguishes between matching and mismatching content. Matches may be detected by checking the structure of objects within the seam or by checking that luminance and chrominance values are within an expected range (if exposure matched, they should be similar, but if exposure between the imagers differed they would be expected to be within a known operating range for that offset with one being bright and the other dark relative to each other). If the content mismatches at the seam, the pixels are flagged as being invalid and during difference selection their values are ignored or replaced, e.g. values from the previous frame or collocated pixels are good replacement candidates, as is explained in paragraph [0031].

For example, In FIG. 6 a mismatch in line segments 612 and 614 corresponding to a ceiling in the scene being imaged may produce the following pixel differences for a neighborhood or sliding window along the seam:

$$\begin{bmatrix} 5 \\ 5 \\ 100 \\ 5 \\ -100 \\ 5 \end{bmatrix}$$

Based on the threshold value of 15 for the diff values, it is clear that the values 100 and −100 are spurious. Thus, the values 100, and −100 are marked as invalid and are replaced with values corresponding $\Delta(j-1)$ for spatial filtering or $\Delta_{frame-1}(j)$ for temporal filtering.

Replacing the values 100, and −100 with $\Delta(j-1)$ and sorting results in the following pixel values of the neighborhood:

$$\begin{bmatrix} 5 \\ 5 \\ 5 \\ \Delta(j-1) \\ \Delta(j-1) \end{bmatrix}$$

where $\Delta(j)=5$.

In one, embodiment, if all pixels are invalid in a region, the last good correction or the same correction from a prior frame may be used. This prevents flickering from having the correction turn off and on between frames. This has been explained in paragraph [0031], and is illustrated in FIG. 6 in the case of the parallactic error that shows up due to the merger of the ellipsoidal portions 608 and 610. The result is that a neighborhood or sliding window of pixels along the seam for the ellipsoidal object 606 may comprise entirely of invalid pixels based on a comparison with pixels of an earlier frame or based on values for collocated pixels. So for example, a sliding widow of pixels along the seam in the region of object 606 may include the following values:

$$\begin{bmatrix} -100 \\ -100 \\ -100 \\ -100 \\ -100 \\ -100 \end{bmatrix}$$

Based on a comparison with pixels of an earlier frame or based on values for collocated pixels each of these pixels may be marked as invalid and replaced with by $\Delta(j-1)$ or a collocated by $\Delta(j)$ corresponding to a prior frame.

In one embodiment, a pixel might be flagged as invalid if the pixel is over or under exposed (clipped). Correcting clipped pixels in calculating $\Delta(j)$ is handled similar to mismatching pixels. Clipped pixels also need special handling in applying the correction. If a pixel is clipped, no correction is applied to those pixels. To prevent a hard transition to the clipped pixels, the correction is feathered around clipped pixels. The weight of the correction applied decreases as for pixels adjacent or in the neighborhood of the clipped pixels The difference correction can be improved by separating the shadows (dark pixels), midrange and highlights (bright pixels) (or more divisions for more precision). A piecewise linear function can scale the individual corrections from dark to bright. If two images have darks that match well but bright pixels that differ, it can adjust each pixel type differently. The dark pixels will have no change from the difference selection whereas the bright pixels will have a correction. Across the linear gradient, each pixel will have a correction applied according to the pixels intensity (or a scaled in between value). A pixel that is determined as dark is left alone in this example while a bright pixel will get the correction.

For example, if the image histogram is divided into 10 bins (for an 8 bit image, that would be every 25 pixel values). The correction for pixels value 0-25 might be 2 and the correction from 26-50 could be 5. To have a smooth transition between those two bins, the correction from 12-37 would linearly interpolate from 2 to 5.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

The method of the present invention may be performed either in hardware, software, or any combination thereof, as those terms are currently known in the art. In particular, the present method may be carried out by software, firmware, or microcode operating on a computer or computers of any type, including preexisting or already-installed image processing facilities capable of supporting any or all of the processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method for blending a left image with a right image along a seam, comprising:
    selecting collocated pixels from a collocated column of pixels in the left image and the right image;
    computing an intensity difference in the selected collocated pixels;

determining an intensity correction amount for each row along the seam based on the computed intensity difference to apply to seam pixels for each row along the seam; wherein the intensity difference is temporally filtered to keep it within a range; and selectively applying the intensity correction amount on a row-by-row basis to a neighborhood of pixels extending transversely across the seam and centered on the seam, wherein for each row the intensity correction amount is applied with a linear gradient across a selected number of pixels given by a blend width;

the linear gradient is calculated as follows:

$$P(i, j) = P\left(i, j \left\{ \begin{array}{ll} \Delta(j) - \frac{(i - \text{seam})}{\text{blend width}}, & i > \text{seam AND } \frac{i - \text{seam}}{\text{blend width}} < \Delta(j) \\ -\Delta(j) + \frac{(\text{seam} - i)}{\text{blend width}}, & i < \text{seam AND } \frac{\text{seam} - i}{\text{blend width}} < \Delta(j) \end{array} \right.\right.$$

for j=1 . . . height; and i=seam±(Δ(j)*blend width).

2. The method of claim 1, wherein computing the differences comprises computing differences in at least one of luminance and chrominance associated with the selected collocated pixels.

3. The method of claim 1, wherein determining the correction amount comprises smoothing at least some of the computed differences based on a spatially adjacent correction.

4. The method of claim 1, wherein determining the correction amount comprises smoothing a least some of the computed differences based on a temporally collocated correction.

5. The method of claim 1, further comprising feathering the correction amount around pixels determined to be clipped.

6. A system for blending a left image with a right image along a seam, the system configured to:

select collocated pixels from a collocated column of pixels in the left image and the right image;

compute an intensity difference in the selected collocated pixels;

determine an intensity correction amount for each row along the seam based on the computed intensity difference to apply to seam pixels for each row along the seam; wherein the intensity difference is temporally filtered to keep it within a range; and selectively apply the intensity correction amount on a row-by-row basis to a neighborhood of pixels extending transversely across the seam and centered on the seam, wherein for each row the intensity correction amount is applied with a linear gradient across a selected number of pixels given by a blend width;

the linear gradient is calculated as follows:

$$P(i, j) = P\left(i, j \left\{ \begin{array}{ll} \Delta(j) - \frac{(i - \text{seam})}{\text{blend width}}, & i > \text{seam AND } \frac{i - \text{seam}}{\text{blend width}} < \Delta(j) \\ -\Delta(j) + \frac{(\text{seam} - i)}{\text{blend width}}, & i < \text{seam AND } \frac{\text{seam} - i}{\text{blend width}} < \Delta(j) \end{array} \right.\right.$$

for j=1 . . . height; and i=seam±(Δ(j)*blend width).

7. The system of claim 6, wherein computing the differences comprises computing differences in at least one of luminance and chrominance associated with the selected collocated pixels.

8. The system of claim 6, wherein determining the correction amount comprises smoothing at least some of the computed differences based on a spatially adjacent correction.

9. The system of claim 6, wherein determining the correction amount comprises smoothing a least some of the computed differences based on a temporally collocated correction.

10. The system of claim 6, is further configured to feather the correction amount around pixels determined to be clipped.

11. A non-transitory computer-readable medium having stored thereon a sequence of instructions which when executed by a system causes the system to perform for a method for blending a left image with a right image along a seam, said method, comprising:

selecting collocated pixels from a collocated column of pixels in the left image and the right image;

computing an intensity difference in the selected collocated pixels;

determining an intensity correction amount for each row along the seam based on the computed intensity difference to apply to seam pixels for each row along the seam; wherein the intensity difference is temporally filtered to keep it within a range; and selectively applying the intensity correction amount on a row-by-row basis to a neighborhood of pixels extending transversely across the seam and centered on the seam, wherein for each row the intensity correction amount is applied with a linear gradient across a selected number of pixels given by a blend width;

the linear gradient is calculated as follows:

$$P(i, j) = P\left(i, j \left\{ \begin{array}{ll} \Delta(j) - \frac{(i - \text{seam})}{\text{blend width}}, & i > \text{seam AND } \frac{i - \text{seam}}{\text{blend width}} < \Delta(j) \\ -\Delta(j) + \frac{(\text{seam} - i)}{\text{blend width}}, & i < \text{seam AND } \frac{\text{seam} - i}{\text{blend width}} < \Delta(j) \end{array} \right.\right.$$

for j=1 . . . height; and i=seam±(Δ(j)*blend width).

12. The computer-readable medium of claim 11, wherein computing the differences comprises computing differences in at least one of luminance and chrominance associated with the selected collocated pixels.

13. The computer-readable medium of claim 11, wherein determining the correction amount comprises smoothing at least some of the computed differences based on a spatially adjacent correction.

14. The computer-readable medium of claim 11, wherein determining the correction amount comprises smoothing a least some of the computed differences based on a temporally collocated correction.

* * * * *